Dec. 8, 1953　　J. J. WILENTCHIK　　2,662,146
VOLTAGE AND POSITION CONTROL SYSTEM
Filed April 14, 1950　　4 Sheets-Sheet 1

INVENTOR.
JERZY J. WILENTCHIK.
BY
ATTORNEY.

Dec. 8, 1953   J. J. WILENTCHIK   2,662,146
VOLTAGE AND POSITION CONTROL SYSTEM
Filed April 14, 1950   4 Sheets-Sheet 2
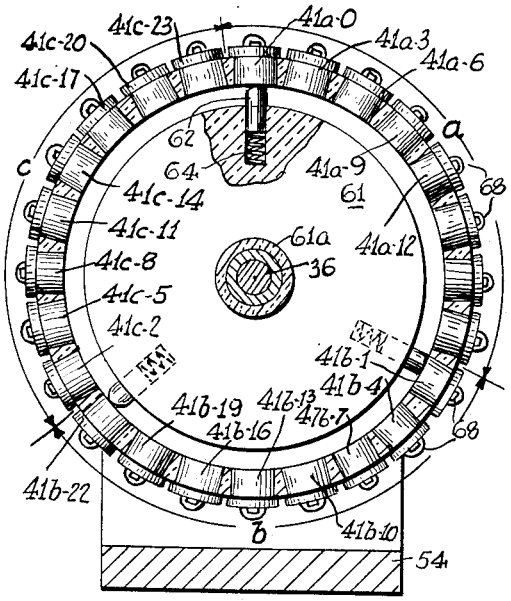
Fig. 3.
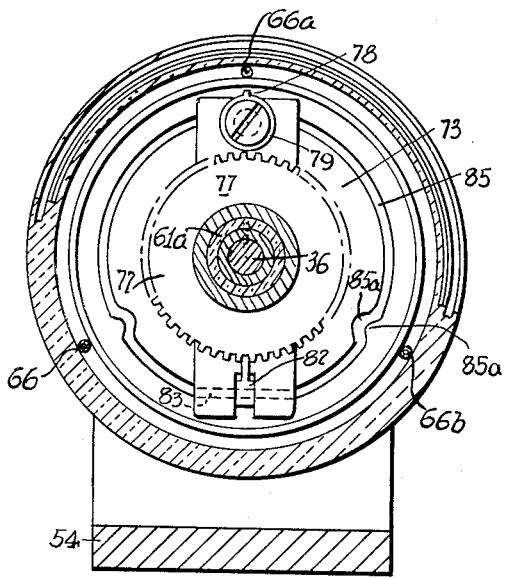
Fig. 4.
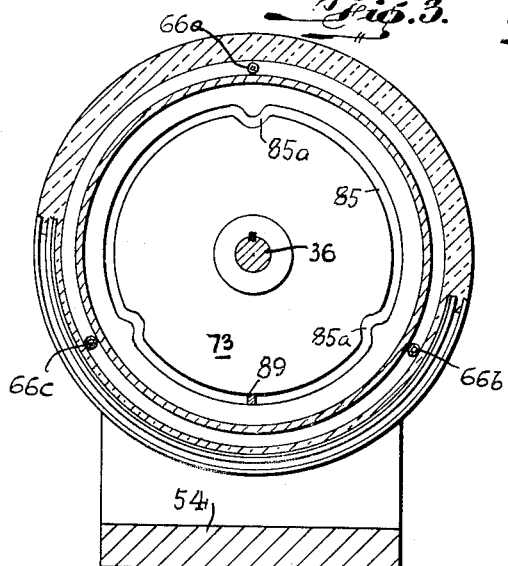
Fig. 5.
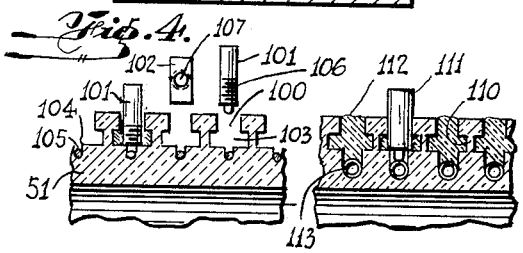
Fig. 6.   Fig. 7.
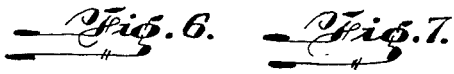
Fig. 9.
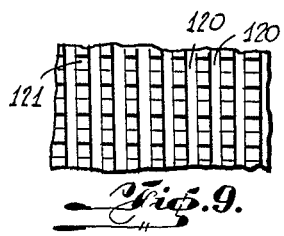
Fig. 8.
Fig. 10.
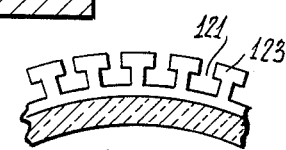
Fig. 3a.
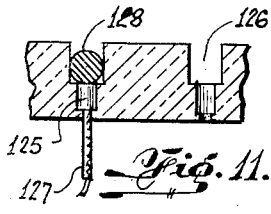
Fig. 11.
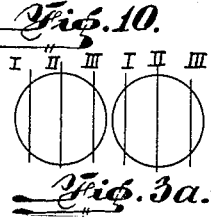
INVENTOR.
JERZY J. WILENTCHIK.
BY
ATTORNEY.

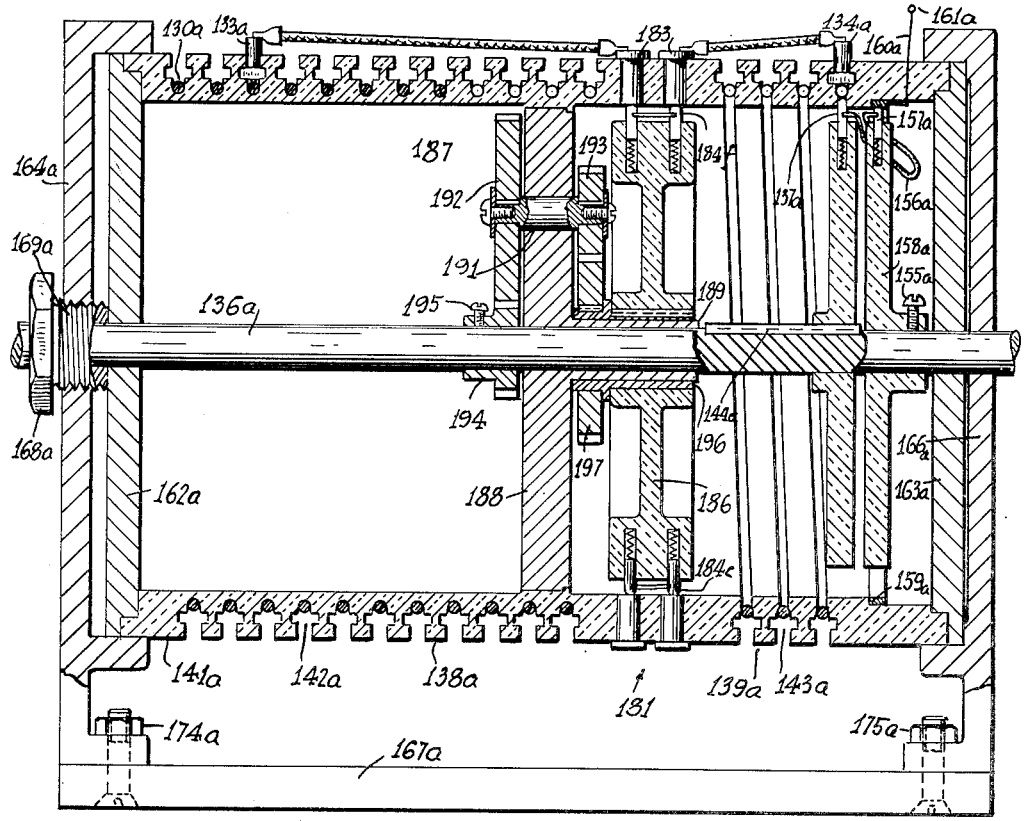
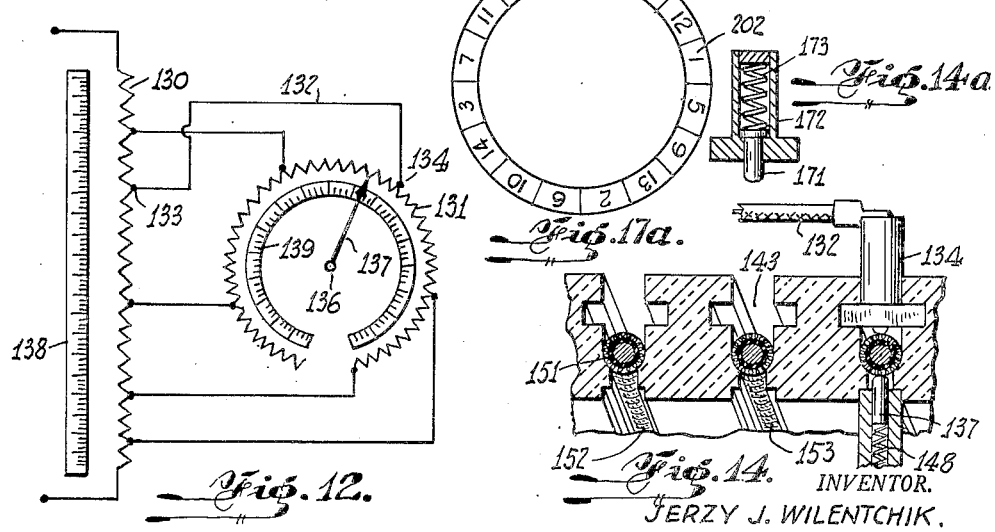

Dec. 8, 1953  J. J. WILENTCHIK  2,662,146
VOLTAGE AND POSITION CONTROL SYSTEM
Filed April 14, 1950  4 Sheets-Sheet 4

INVENTOR.
JERZY J. WILENTCHIK.
BY
ATTORNEY.

Patented Dec. 8, 1953

2,662,146

UNITED STATES PATENT OFFICE 2,662,146

VOLTAGE AND POSITION CONTROL SYSTEM

Jerzy J. Wilentchik, New York, N. Y.

Application April 14, 1950, Serial No. 155,864

34 Claims. (Cl. 201—48)

This invention relates to improvements in voltage and in position control systems comprising primary control means, wherein the output "$y$" can be varied as a function of the displacement "$x$" of the control means according to any desirable function $y=f(x)$.

An object of the invention is to provide a system of the aforementioned character in which the output function "$y$" is expressed in voltage units and composed of a large number of straight lines, the location and the slope of the latter in the plane "$x-y$" being determined individually and set into the instrument in such manner that the approximated contour of the generated function is obtained.

Another object of this invention is to provide means for changing the shape of the output function easily and quickly, without dismantling the instrument and without stopping its operation.

Several features of novelty characterize this invention over my co-pending application Serial No. 139,572 filed on January 20, 1950.

One of them deals with design and constructional modification of the interpolating unit and aims to eliminate the "zone of constant potential" during the period of commutation.

Another feature of novelty is concerned with design and constructional modification of the attachable contact devices, of the mandrel and of the commutator unit, respectively.

A further feature of novelty embodies an interrupted motion coupling comprising a combination of spur gears and can be used as a counter device for general purpose applications outside of its being used in conjunction with the characteristic changer.

A still further development of the basic idea allows elimination of the intermittent motion coupling and enables setting of individual points of a function $y=f(x)$ at controlled intervals along the "$x$" axis.

For a better understanding of the invention, its advantages over the existing art and the specific objectives attained with its use, reference should be had to the following description and accompanying drawings in which preferred embodiments of the invention have been illustrated and described.

In the drawings:

Fig. 3 is a transverse sectional view taken along the line 3—3 in Fig. 2.

Fig. 3a is a magnified view of a pair of bars in the commutator to indicate possible stable positions of the sliding contacts.

Fig. 4 is a transverse, sectional view taken along the line 4—4 in Fig. 2.

Fig. 5 is a transverse sectional view taken along the line 5—5 in Fig. 2.

Fig. 6 is a sectional view (partly broken) of a constructional modification in the mandrel and in the attachable contact pin.

Fig. 7 is a sectional view (partly broken) of a constructional modification in the mandrel and in the contact pin to be used with fixed function forms.

Figs. 8 to 10 include two cross sectional views and a front view (all partly broken) of a mandrel's constructional modification.

Fig. 11 is a sectional view (partly broken) of a mandrel-contact pin arrangement to be used with fixed function forms.

Fig. 12 is a diagrammatic view of a modification of the system according to the invention.

Figure 13:
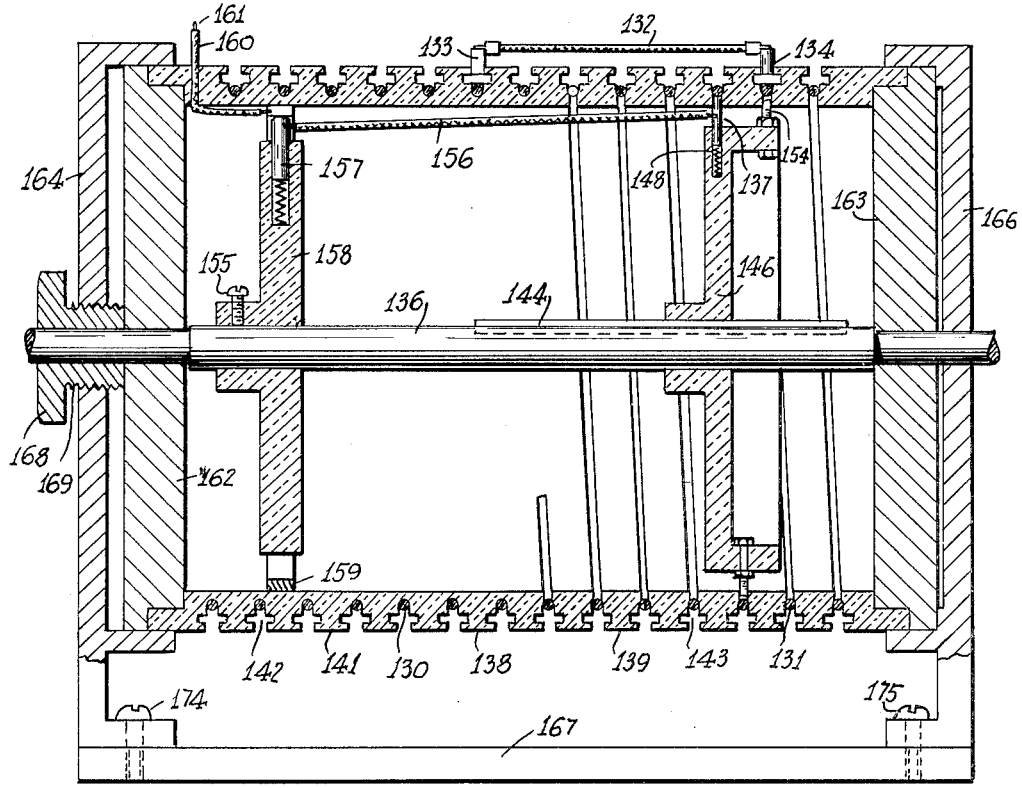

Fig. 13 is a cross sectional view of the instrument according to Fig. 12.

Figures 13A, 15:
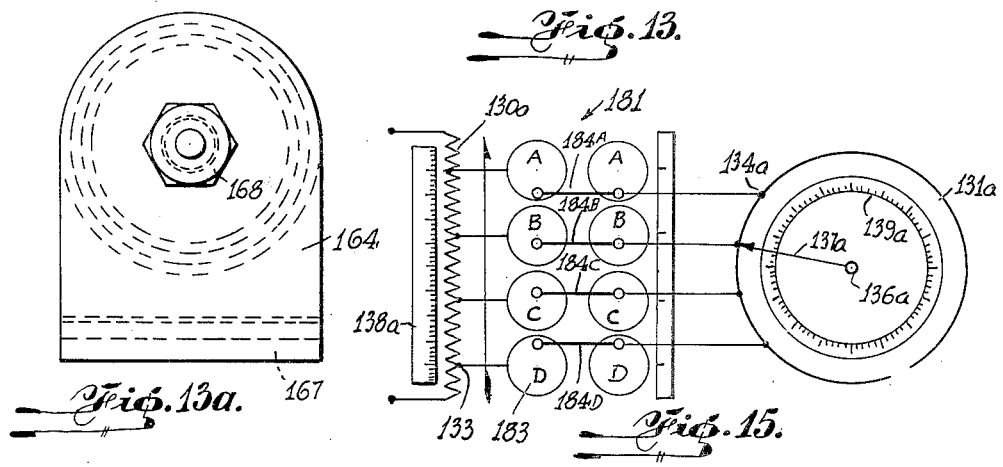

Fig. 13a is a rear view of the instrument according to either Fig. 13 or Fig. 17.

Fig. 14 is a sectional view (partly broken) of a constructional modification of the mandrel.

Fig. 14a is a sectional view of a constructional modification of the contact pin.

Fig. 15 is a diagrammatic view of a modification of the system according to Fig. 12.

Figure 16:
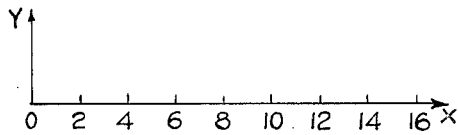

Fig. 16 is a diagram to help understand the operation of the system.

Fig. 17 is a cross sectional view of the instrument according to Fig. 15.

Fig. 17a is a diagrammatic representation of a scale to be used with the arrangement in Fig. 17.

Figures 1, 2:
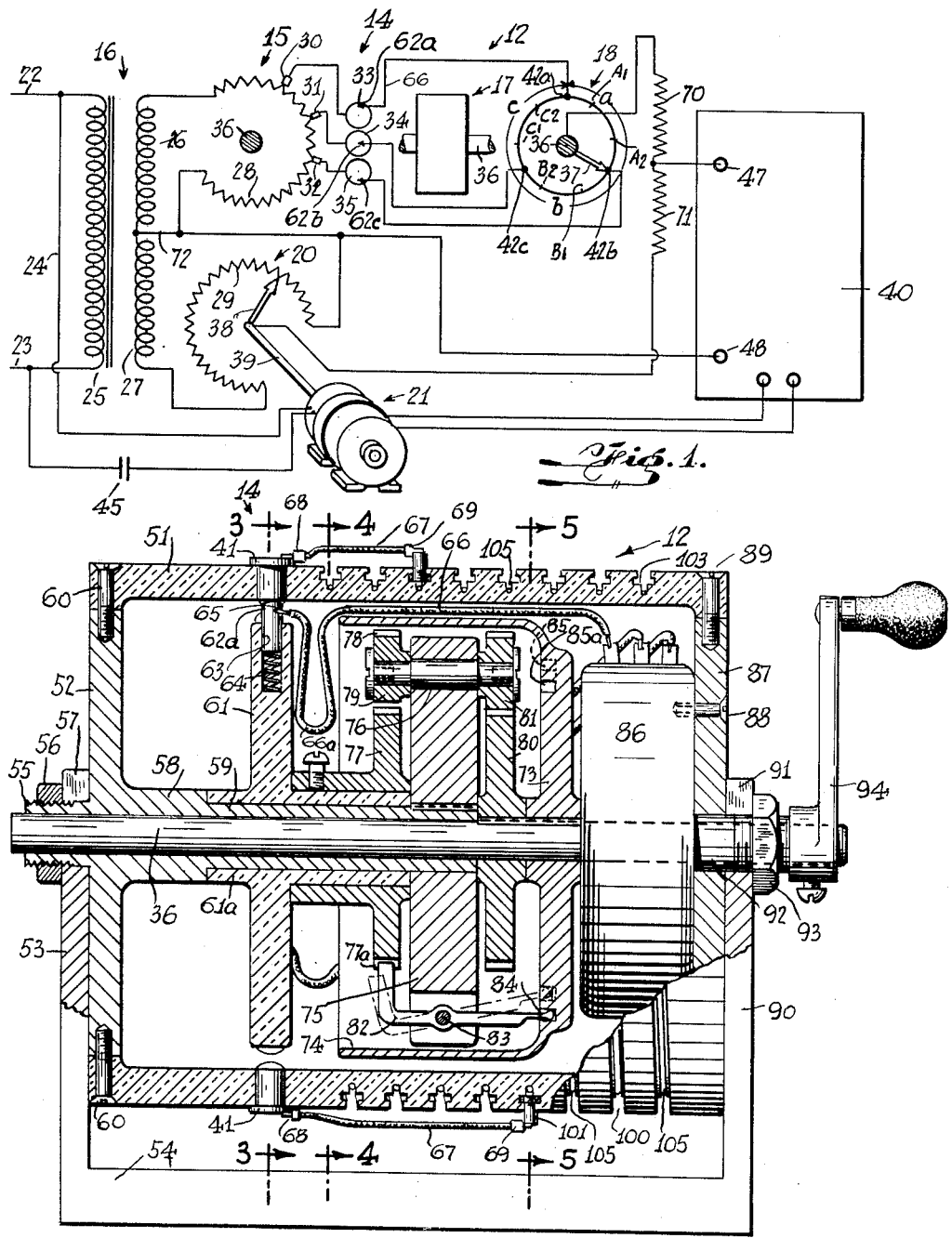
Fig. 1 is a functional diagram of a unit control system according to the invention.
Fig. 2 is a longitudinal sectional view of the instrument according to the invention.

Referring to Fig. 1, there is shown schematically a commutator 14 consisting of a plurality of bars and being subdivided into three sectors, the number of bars in each sector being the same. Only the bars 33, 34 and 35 representing respective groups of bars in each sector are shown in Fig. 1. The bars in each group are insulated electrically from each other and connected electrically to respective attachable contact pins. Thus, the bars 33, 34 and 35 are connected to respective pins 30, 31 and 32. The attachable contact pins may become associated conductively with a selective resistance element 28 of a resistance unit 15, at any selected point thereof and assume thus a desirable value of potential which is transferred to respective bars of the commutator 14. Sliding contacts 62a, 62b, and 62c can be displaced in engagement with and relative to bars in each respective sector by an intermittent motion coupling 17 controlled by the input shaft 36. The potentials of the contact devices 62a, 62b and 62c are applied to respective tap connections 42a, 42b and 42c of a potentiometer resistance 18 controlled by the input shaft 36. The potential of the wiping contact device 37 of the potentiometer 18 is the output potential of the instrument.

The components mentioned in the foregoing section are described in more detail with reference to Fig. 2 and to other figures of this specification. Referring first to Fig. 2 and to Fig. 6, there is shown a cylindrical, non-conducting mandrel 51 provided with a helical, recessed T slot 103, and with a helical groove 104 located centrally with respect to the slot 103. A straight resistance wire 105 is wound helically within and along the length of the groove 104. The voltage drop for every complete turn of the wire 105 is the same assuming uniform threading, uniform wire material and uniform wire distribution in the groove 104. Thus, the potential at any selected point of the wire 105 is a linear function of length and can be identified easily by the number of complete and fractional turns of said wire contained between a terminal thereof and the selected point. A helical scale (not shown) can be arranged along and parallelly to respective sections of the slot 103 indicating the voltage drop along the resistance 105. Resistance points at the zero and at the maximum scale indications are connected to a voltage supply source (not shown in Figs. 2 and 6 but shown in Fig. 1 as a suitable secondary of a transformer).

The attachable contact pin consists here of a contact screw 101 provided with a thread 106 and of a nut 102 provided with a tapped center hole 107. The nut 102 can be inserted manually at any desirable location in the helical slot in a mandrel upon which the screw 101 is turned all the way in until an electrical contact is established with the resistance wire 105. To prevent the turning of the nut 102 inside the recess of the helical slot 103 the former can be made of a rectangular cross-section. The length of the nut 102 is slightly more, its height slightly less than the width and height of the base of the helical slot respectively. The width of the nut 102 is slightly less than the width of the nut recessed section of the slot 103. Thus the nut 102 can be inserted into the slot but cannot turn when inserted except for small deflection to either side of the recess which will prevent its falling out, while or after the contact screw 101 has been screwed in.

The arrangement described in Fig. 6 herein, can be used for low voltage application with relatively short wire length requirements. For higher voltage applications where the number of helical turns necessary to accommodate longer wire lengths may become excessive a helical wire coil 113 could be used and the groove form indicated by numeral 110 becomes then as shown in Fig. 7.

The same result can be obtained in a different way, as shown in Figs. 8, 9 and 10 by providing a mandrel 51a with a plurality (preferably 25, 50 or 100) of shaped longitudinal slots 121 evenly distributed along its circumference and with a continuous, helical groove 120 extending from its one end to its other end. The shape of the longitudinal slot 121 is that of a T. Similarly the shape of a section 123 separating any two contiguous slots 121 is that of a T inverted with respect to the slot 121. A straight resistance wire 122 is wound helically within and along the length of the groove 120. Since the respective turns of the groove 120 can be spaced very close to each other, many more turns of wire can be accommodated in this arrangement than in the arrangement in Fig. 6. The attachable contact pins can have a form as shown in Fig. 6 or as shown in Fig. 7, wherein, the attachable pin 111 is forced into the slot 110 at a desirable location thereof upon which the slot 110 is filled with air-dry insulating compound. The arrangement in Fig. 7 can be used with fixed voltage functions only.

Another type of arrangement to be used with fixed voltage functions is shown with reference to Fig. 11, wherein the contact pins 125 are forced into holes drilled at selected locations along the helical slot 126. The connections between the respective pins 125 and the commutator bars (not shown) are made internally by means of conductors 127. The resistance wire 128 is wound along and within the slot 126 and makes positive electrical contact with respective pins 125, by pressing on them.

It will be understood that the mandrel's form must not necessarily be limited to a cylinder. It can be a cube, a plate or any desirable geometric body, provided the dimensions around which the resistance is wound do not vary.

Referring back to Fig. 2, there are shown respective bars 41 (identical with bars 33, 34 and 35 of Fig. 1) radially disposed along the circumference of the mandrel 51. The mandrel 51 is provided with the helical slot 103 housing the resistance wire 105. Every bar 41 is provided with an external conductor 67 connecting it electrically to a respective attachable contact pin 101. The respective connections are indicated at 68 and 69 and generally can be done by soldering, screw connection, plugging or other suitable means.

Referring to Fig. 3, three sliding contacts 62a, 62b and 62c (only the contact 62a being shown in Fig. 2) are adapted to be disposed in conductive engagement with the bars 41 in respective sections of the commutator 14. The sliding contacts 62a, 62b and 62c are carried by an insulating carrier 61, mounted on a stationary sleeve 59, the latter acting as a bearing surface. The displacement of the carrier 61 is controlled by an intermittent motion coupling 17 in the following manner: A control shaft 36 (the input shaft of the instrument) is provided with a spur gear 80, the latter controlling the angular displacement of a gear 81 and a shaft 76 coupled operatively to it. A bearing block 75 is fastened to the stationary sleeve 59 and supports the gear 81 and another single-teethed gear 79 controlled by the gear 81. The gear 79 when rotated will engage and displace intermittently a gear 77, the latter linked operatively to the contact carrier 61. The gear 77 and the carrier 61 are mounted freely on the stationary sleeve 59. The carrier 61 is provided with three contacts (only the contact 62a being shown in Fig. 2) the latter in conductive engagement with respective bars 41. The sleeve 59 is an extension of hub 58 and serves as a bearing surface for the shaft 36.

From the above description, it is evident that the angular displacement and the sense of rotation of the carrier 61 are related directly to the magnitude and to the direction of rotation of the shaft 36. Assuming that the gear 79 has a varying number of teeth from one to three, the corresponding angular displacement of the carrier 61 will occur once, twice or three times for every complete revolution of the shaft 36. A multiple intermittent motion effect of course could be obtained by having one single tooth in the gear 79 but varying gear ratios between the gears 80 and 81. In Fig. 2 the gear ratio is three to one.

To prevent the gear 77 from accidental loose motions due to vibrations, the bearing 75 is provided with a pivotally attached locking tooth device 82 mounted at 83 and being forced in a normal operating position between a respective pair of teeth 77a of the gear 77 thus locking it in its position. The forcing in action is being accomplished by a grooved disc 73 attached fixedly to the shaft 36 and turning together with it. The tail 84 of the tooth 82 is inserted in a shaped groove 85 in the disc 73 and will follow a curved path conforming to the curvature of the groove 85. The form of the groove 85 is shown more clearly in Figs. 4 and 5. The operation of the disc 73 and of the single toothed gear are coordinated in such a manner that normally the inside ridge of the groove 85 will exert a pressure outwardly on the tail 84, producing thus a forcing-in action on the tooth 82. As shown in Fig. 5 the groove 85 is provided with deformities or indentations at even angular intervals from each other to produce a camming action on the tail 84. Assuming that for every complete revolution of the shaft 36, the gear 77 should turn three distinct steps, there would be three indentations 85a, spaced at 120 degrees. As the teethed gear 79 is rotated and approaches the meshing point with the gear 77, the tail 84 will cooperate with a respective indentation 85a and be forced inwardly, thus separating the tooth 82 from the gear 77 and releasing the latter for displacement by the single teethed gear 79.

The sliding contacts 62a, 62b and 62c are connected by respective conductors 66a, 66b, 66c (shown in Fig. 4) to respective taps 42a, 42b and 42c of the potentiometer 18 housed in a cylindrical frame indicated at 86. To prevent the conductors 66a, 66b and 66c from interfering with movable components of the intermittent motion coupling 17, a cylindrical shield 74 is provided. The housing 86 can be coupled to an end plate 87 by means of screws 88 to prevent it from becoming entrained in the rotational displacement of the shaft 36. The mandrel 51 is connected to the supporting end plates 87 and 52 by means of respective screws 89 and 90. The instrument is mounted on the plates 53 and 90, and fastened to them by means of respective nuts 56 and 93. When attaching the contact pins 101, the nuts 56 and 93 are loosened and the mandrel 51 rotated by hand until the desirable inserting position along the slot 103 is located. After all the pins 101 have been inserted, the mandrel 51 is returned to its normal position and the nuts 56 and 93 retightened against the plates 53 and 90, the latter being a part of a supporting frame 54. The shaft 36 can be controlled in manual control applications by a suitable input handle 94. To indicate the fractional and the complete revolutions of the shaft 36, a dial of any commercially available type could be used being coupled operatively to the shaft 36.

For a better understanding of the operation of the apparatus disclosed so far reference should be had to Figs. 1 and 3.

Referring first to Fig. 3, there are shown bars 41 subdivided into three respective sections "a," "b," and "c" each section having the same number of similarly disposed bars. The bars in a respective section can be identified by the identification index of that section. Thus bars 41 in a section "a" would be referred to as bars 41a and bars in the respective sections "b" and "c" by identification indexes 41b and 41c. To avoid confusion, bars in every section are assigned individual identification numerals which are respectively:

0, 3, 6, 9, 12, . . . for bars 41 in the section "a"
1, 4, 7, 10, 13, . . . for bars 41b in the section "b"
2, 5, 8, 11, 14, . . . for bars 41c in the section "c"

Thus, a full name-plate of a bar can be for example 41b–10 or 41c–8. The respective numerals 0, 1, 2, 3, 4, . . . represent equidistant points situated along the "x" axis of the function $y = f(x)$ for which desirable selected values of "y" can be set into the instrument. Between any two values of "y" thus preset, a linear interpolation is performed with assistance of the potentiometer 18.

Any one of the sliding contacts 62a, 62b and 62c can assume one of three positions with respect to a respective bar 41 of the commutator 14 through action of the intermittent motion coupling 17. This is explained more clearly with reference to Fig. 3a where I, II, III are lines indicating the possible stable positions of any one of the sliding contacts 62a, 62b and 62c relative bars 41 in a respective section of the commutator 14. (Stable position is called a position in which the gears 77 and 79, shown in Fig. 2, are not meshing). To indicate the location of a sliding contact relative to bars 41, position identification can be obtained by adding the indexes I, II, or III to the name plate of an individual bar 41. Thus a sliding contact 62a engaging a bar 41a–6 in position II will be referred to as located at 41a–6–II.

Referring back to Fig. 1 in the zero displacement position of the control shaft 36, the potentiometer's contact 37 would be located opposite the tap 42a, the sliding contact 62a would be located at 41a–0–II, the contact 62b at 41b–1–I and the contact 62c at 41b–22–III. As the shaft 36 is being rotated clockwise from its zero displacement position and the potentiometer's rotating contact 37 reaches some arbitrary point $A_1$, the single teethed gear 79 of the intermittent motion coupling 17 will engage the gear 77 (the gears 79 and 77 being shown in Fig. 2) and cause clockwise angular displacement of the sliding contacts 62a, 62b and 62c (see also Fig. 3). As result of the controlling action of the interrupted motion coupling the sliding contact 62a will be transferred to position 41a–0–III, the contact 62b to position 41b–1–II and the contact 62c to a position 41c–2–I. When the contact 37 reaches a point $A_2$, the controlling action of the intermittent motion coupling stops and the engaging teeth of the gears 79 and 77 disengage. Upon further clockwise displacement of the shaft 36, the potentiometer's contact 37 will by-pass the tap 42b and reach a point $B_1$ at which the controlling action of the intermittent motion coupling 17 restarts and results in the transfer of respective sliding contacts 62a, 62b and 62c to respective positions 41a–3–I, 41b–1–III and 41c–2–II. The controlling action of the intermittent motion coupling will end at some point $B_2$ and restart at point $C_1$, shifting the respective contacts 62a, 62b and 62c to respective positions 41a–3–II, 41b–4–I and 41c–2–III. The action of the intermittent motion coupling stops at some point $C_2$, and as the contact 37 reaches the tap 42a, the shaft 36 has completed its one full revolution. The principle of operation explained above will apply to any following number of revolutions and to counter-clockwise sense of rotation of the shaft 36.

From the above description, it is evident that the transfer of the sliding contact 62a from a respective bar 41a to the next following bar 41a coincides with the potentiometer's contact 37 moving between the taps 42b and 42c. Similarly the commutation timing of the sliding contacts 62b and 62c coincides with the contact 37 moving between the taps 42c and 42a and 42a and 42b respectively. Thus, commutation effect has no direct bearing on the output potential of the instrument and the continuity of the generated function is preserved throughout the entire range of operation.

In design of the commutator unit, the following precautions should be observed:

1. The width of the sliding contact should be less than the distance between a pair of contiguous bars.

2. The distance between the positions I and III of two contiguous bars should be equal to respective distances between the positions I and II and II and III in any one bar of the commutator 14.

While the preferred embodiment of the interpolating means has been described with reference to a three tap potentiometer coil, it should be borne in mind that it can be applied to continuous potentiometer coils having a varying number of taps spaced uniformly from each other. This applies in particular to continuous potentiometer coils provided with a pair of taps at 180 degrees apart. The only difficulty with this arrangement is that the commutation period is critically short and therefore the timing of the intermittent motion coupling with respect to the displacement of the potentiometer's contact 17 has to be very carefully adjusted. In general, for "$n$" tap continuous potentiometer coil, there would be "$n$" sections in the commutator and "$n$" sliding contacts associated with them.

Instead of a single intermittent motion coupling controlling simultaneously the three sliding contacts of the commutator 14, three separate couplings could be provided to control independently the displacement of each of the sliding contacts, but it is doubtful whether the advantage of such modification will outweigh design complications connected with it.

In general, the respective sections of a potentiometer contained between respective taps thereof, should have an electrical resistance that is high enough with respect to the selective resistance 15 (see Fig. 1) to prevent appreciable loading effect.

With reference again to Fig. 1, there is shown schematically a unit control system using a characteristic changer 12—linear potentiometer resistance 29 combination incorporated in a bridge network of a more general character and adapted to be used with an alternating voltage supply. The purpose of this system is to control the displacement "$y$" of a motor driven load as a desirable function $y=f(x)$ of displacement "$x$" of the control shaft 36. The resistance 28 of the characteristic changer 12 and the resistance 29 of the potentiometer unit 20 are equal to each other and connected in series across a source of voltage supply which can be a suitable center-tap transformer 16. The common junction point of the resistances 28 and 29 and the center tap of the secondary windings 26 and 27 of the transformer 16 are connected to an input terminal 48 of a combination voltage and power amplifier 40 (shown in block diagram). The former is referred to as the effective zero voltage reference point of the system and is indicated at 72. The output contact devices 37 and 38 of potentiometers 18 and 29 respectively are connected to an input terminal 47 of the amplifier 40, through respective equal resistances 70 and 71, the latter being many times higher than the resistances 28 and 29, thus eliminating loading effect.

The operation of the bridge circuit described above is as follows:

In a balance condition of the circuit, the potential magnitude of the contact 37 will equal that of the contact 38, but their voltage polarities with respect to the zero reference point 72 will be 180 degrees out of phase, it follows, that the effective potential drop between the terminals 47 and 48 is zero.

If the potential of the contact 37 is by "$v$" volts higher than that of the contact 38, a potential of $v/2$ volts will be produced between the terminals 47 and 48. The polarity of this voltage drop would be the same as the polarity of the winding 26.

By the same token, if the potential of the contact 37 is lower by "$v$" volts than the potential of the contact 38, a voltage drop of $v/2$ volts would appear between the terminals 47 and 48 and be of the same polarity as the polarity of the winding 27.

Thus, for a condition of unbalance, the voltage applied to the voltage amplifier 40 can be in phase or 180 electrical degrees out of phase with voltage source 16 considered as a reference. In general the polarity of the error voltage depends on whether the ratio of the mechanical input "$x$" to the characteristic changer 12 and of the electrical output "$y$" from the linear potentiometer 29 is higher or lower than that determined by the function $y=f(x)$. This relationship provides the means following amplification for driving the balancing motor 21 in the proper direction of rotation to rebalance the control circuit. The balancing motor may be a two phase reversible induction motor having two separate windings, one winding being connected to the output terminals of the amplifier 40 and the other winding through condenser 45 to the A. C. voltage supply legs 22 and 23. The amplifier 40 can be a combination of voltage and of polarity sensing power amplifiers of any conventional or commercially available type. The motor 21 will rotate in one sense or the other or remain stationary depending on whether the error voltage is positive, negative or zero respectively. If the error voltage is zero, the current output of the amplifier 40 is composed of two actual pulses for each cycle of the supply voltage tending to drive the motor unit in one direction on one half and in the opposite direction on the other half cycle and resulting in no motion of the motor. If the error voltage is positive (in phase with the voltage source), the current output from the power amplifier will be composed of pulses in phase with the positive pulses of the voltage source. If the error voltage changes signs, the supply current to the motor will be shifted 180 degrees in phase, and the motor will reverse its sense of rotation. The speed of the motor 21 in either direction depends on the magnitude of the error voltage and decreases as the error voltage decreases. It will be understood from the foregoing explanation that the motor 21 displaces the contact 38 in conductive engagement with the resistance 29 in such direction that tends to decrease the error voltage until it becomes zero, upon which the motor is stopped. The motor shaft 39 drives a load (not shown), which can be any position controlled object.

For monotonous functions $y=f(x)$, (the slope remains positive or negative throughout the entire range), the respective locations of the characteristic changer 12 and of the linear potentiometer unit 20 with respect to the bridge network could be reversed without affecting the performance. In such an arrangement, the linear potentiometer would be controlled manually and the characteristic changed by means of a motor unit.

In the embodiments of the invention described so far the change of slope of a function $y=f(x)$ could be effected only in a limited number of equidistant points situated along the "$x$" axis. Such an arrangement may be not satisfactory for functions having large slope variations and in particular for functions having steep slopes.

Referring to Fig. 12, there is shown schematically an arrangement that will satisfy any slope specifications of a function. It consists basically of a selective resistance 130, substantially similar to that shown at 15 in Figs. 1 and 2, of a linear potentiometer resistance 131 and of a desirable plurality of selective connecting conductors 132. Each conductor 132 is provided with a pair of attachable contact pins 133 and 134 at its two ends respectively. The contact pins 133 and 134 can be attached selectively at desirable locations along the respective resistances 130 and 131. The resistance 130 is connected across a source of voltage (not shown) and generally its total resistivity value will be many times lower than that of the resistance 131. A contact device 137 is adapted to be displaced by a control shaft 136 in conductive engagement with the resistance 131 and the potential of the latter is the output potential of the instrument. Neglecting the loading effect, which will be negligible for monotonous functions it is evident that the potentials of the pins 133a will be superimposed at desirable selected tapping points along the resistance 131 and that the distribution of potential between a pair of such contiguous tapping points will be approximately linear. The value of potential along the resistance 130 can be selected with the assistance of a linear scale 138 arranged along the length of the former. Correct setting points for the pins 134 can be identified with the help of a scale 139 arranged parallelly and along the length of the potentiometer resistance 131.

Referring to Fig. 13, there is shown a hollow, non-conducting, cylindrical mandrel 141 provided with a helical recessed T, multi-turn slot 142, similar substantially to slot 103 in Figs. 2 and 6 and with another helical slot 143, similar in form to the slot 142, except that it extends all the way across the mandrel's 141 wall thickness. The slots 143 and 142 are located at respective right and left hand extremities of the mandrel 141. The selective resistance 130 and the potentiometer resistance 131 are arranged within and along the length of the slots 142 and 143 respectively, the arrangement of the resistance 131 in the slot 143 being shown more clearly in Fig. 14. The control shaft 136 is provided with a key 144 and controls a non-conducting disc 146 carrying a contact element 137, the latter being in conductive engagement with the resistance 131 through the action of a spring 148. The disc 146 can be entrained in the rotational displacement of the shaft 136 through action of the key 144, but is free to move simultaneously along the length of the shaft 136 in such a manner that the contact 147 can follow the curvature of the slot 143 without breaking the conductive engagement with the resistance 131. This is shown more clearly with reference to Fig. 14, wherein 149 is a heavily insulated copper core, the insulation being indicated at 151 and having a resistance wire 152 wound by closely spaced turns along its outside circumference. The core 149 is bent into a helical form to fit the curvature of the slot 143 and is inserted therein. The resistance 130 can be arranged in a manner similar to that of resistance 131, or to be a straight resistance wire laid in the slot 142. An internal slot 153 runs parallelly to the slot 143 and serves as a guide for the disc 146.

Referring back to Fig. 13, the disc 146 is provided with a guide-pin 154 riding freely in the slot 153 and guiding the former with respect to the latter. Thus, as the shaft 136 is rotated, the disc 146 would be displaced longitudinally and rotationally with respect to the mandrel 141. The same result could have been obtained by providing a stationary threaded sleeve to support the rotating disc 146, the respective threads in the former being parallel to the slot 143 or by an arrangement shown in Fig. 14. The slot 153 extends to the very end of the mandrel 141, thus no difficulty would be encountered when inserting the disc 146 and the pin 154 in their operating position inside the mandrel 141. The contact 137 is connected by means of a conductor 156 to a contact 157 carried by a non-conducting disc 158, the latter coupled operatively to the shaft 136 by means of a screw 155. The contact 157 wipes against a stationary collector ring 159, the latter being connected to the output terminal 161 of the instrument, by means of a conductor 160. The shaft 136 is supported by a pair of end plates 162 and 163, the latter in turn being supported by respective frame plates 164 and 166. The frame plates 164 and 166 are coupled fixedly to a base-plate 167, by respective screws 174 and 175. A bushing screw 168 provided with an external thread 169 cooperates with the frame 164 and is adapted to be turned in, exerting pressure on the end plate 162, thus imparting rigidity to the mandrel 141. When setting the instrument for a certain form of a function, the bushing screw 168 is loosened and the mandrel 141 can be then rotated freely by hand until a right slot position for inserting a respective attachable contact pin is found.

The attachable contact pins 133 and 134 can be designed according to Figs. 6 and 7 and 11. An alternative arrangement shown in Fig. 14a comprises a contact element 171 adapted to cooperate internally with a flanged shell 172, the latter adapted to be inserted in the helical slot 142 or 143 at any desirable location thereof by a 90 degree turn to either side. The contact with the resistance wire and the "holding in" effect are accomplished by means of a spring 173. This type of arrangement has been described in my above mentioned co-pending application and therefore is not discussed at length herein.

The respective scales 138 and 139 comprise a plurality of divisions and numerals stamped, imprinted, or otherwise made visible on sections of the mandrel 141, in between respective slots 142 and slots 143. Both said scales are linear, helically arranged with respect to the mandrel 141 but parallel to respective slots 142 and 143. The slots 142 and 143 may be, or may be not parallel to each other, depending on design considerations.

To indicate the fractional and the complete revolutions of the shaft 136, a dial of any commercially available type could be attached to the frame 166 and coupled operatively to the shaft 136. Such a dial would have to comprise a pair of scales, one for indication of the complete revolutions and the other for indicating fractions of revolutions of the shaft 136.

The loading effect in the arrangement described with reference to Figs. 12 and 13 will depend primarily on the ratios of respective resistance sectors contained between a pair of pins 133 and a pair of pins 134 respectively. For small resistance 131 to the resistance 130 ratios and for excessive function slopes, as for instance in irregular wave form functions the loading effect may be appreciable. To eliminate the loading effect independently of function slope variations, a modification of the arrangement described with reference to Figs. 12 and 13 can be employed and is described with reference to Figs. 15, 16 and 17. Since only minor changes with respect to the arrangement in Figs. 12 and 13 have been instituted herein, parts of the assembly being substantially similar to those described in Figs. 12 and 13 have been assigned same numerals with addition of a subscript "a." The functional description of those parts will be found with reference to Figs. 12 and 13.

Referring first to Fig. 15, there is shown schematically a commutator unit 181 comprising a plurality of bars 183, arranged in pairs and subdivided into four sections "A," "B," "C," "D," each section being composed of same plurality of pairs of bars, similarly disposed with respect to each other. Only eight bars representing respective pairs of bars in each section have been shown in Fig. 15. Four contact devices 184A, 184B, 184C and 184D controlled by the shaft 136a are adapted to be disposed along and in conductive engagement with the bars 183 in respective sections of the commutator 181. Half of the bars in each section is connected electrically to respective attachable contact pins 133a and the other half to respective pins 134a. The contact devices 184A, 184B, 184C and 184D will short circuit simultaneously, respective pairs of bars connected to contact pins 133a and 134a in respective sections "A," "B," "C" and "D." Thus the loading effect on the resistance 131a will be limited to four tapping points at a time and may be considered as insignificant under any operating conditions. Provided, there are altogether "m" pairs of bars in the commutator 181, the resistance 131a may be considered as divided into "m" uniform sectors, each attachable contact pin 134a being adapted to be connected manually at any selected point in its respective sector, but not in any other sector.

Four contact devices are being used in this modification to eliminate the occurrence of open circuits during the period of commutation. The principle of operation is similar to the one discussed with reference to Figs. 1 and 3, except for the fact that the commutator 181 comprises four sections instead of three. Moreover, instead of an intermittent motion coupling, a continuous gear coupling is being used herein, consequently the displacement of the contacts 184A, 184B, 184C and 184D is continuous, not intermittent. The bars 183 in each section of the commutator 181 can be assigned individual identification numerals representing equidistant points 0, 1, 2, 3, . . . situated uniformly along the "x" axis of the function $y=f(x)$, as shown in Fig. 16. Thus, the following identification numerals will hold for bars in each respective section of the commutator 181:

0, 4, 8, 12, . . . for bars 183 in section "A"
1, 5, 9, 13, . . . for bars 183 in section "B"
2, 6, 10, 14, . . . for bars 183 in section "C"
3, 7, 11, 15, . . . for bars 183 in section "D"

The respective displacements of the contacts 184A, 184B, 184C and 184D and that of the contact 137 are coordinated in the following manner: It can be seen in Fig. 15, that while the contact device 137 is located between contact pins associated with the bars 183B and 183C, the contact 184A is situated at the lower extreme end of a respective pair of bars 183A, the contact 184D is situated at the upper extreme end of a respective pair of bars 1183D and the contacts 184B and 184C assume some intermediate positions with respect to the bars 183B and 183C. As the shaft 136a is being displaced in a clockwise direction of rotation, the contacts 184A, 184B, 184C and 184D will be displaced in a direction as indicated by the arrow. The contact 184D will be the first to commutate, but the effect of commutation will not affect the potential of the potentiometer contact 137a, since the latter will be situated at that time somewhere between attachable pins 134a which are associated with the bars 183 in the sections "A," "B" or "C." Similarly, should the direction of rotation of the shaft 136a be reversed, the contact 184A would be the first one to commutate, but since the contact 137a is now located somewhere between the attachable pins 134a which are associated with the bars 183 in sections "B," "C" and "D" respectively, the commutation will have no effect on the output potential. The same principle of operation will apply to any position of the contact 137a and of the sliding contacts 184A, 184B, 184C and 184D and can be expressed in a more general form shown below:

184A commutates—137a interpolates between sections "B," "C," "D"
184B commutates—137a interpolates between sections "A," "C," "D"
184C commutates—137a interpolates between sections "A," "B," "D"
184D commutates—137a interpolates between sections "A," "B," "C"

Referring to Fig. 17, there is shown a sectional view of the apparatus according to Fig. 15. A non-conducting contact disc 186 is adapted to be entrained in the rotational displacement of the shaft 136a by means of a gear train 187. Assuming that the resistance 131a extends along the length of four complete turns of the slot 143a, and considering the fact that the commutator 181 has four sections, the maximum travel of the contact 137a would be four revolutions, and the corresponding travel of the contacts 184A, 184B, 184C and 184D only one quarter of a revolution. The ratio of the rotational displacement of the shaft 136a to that of the contact disc 186 is thus 16 to 1, and can be realized mechanically in the following manner.

A bearing block, provided with a sleeve extension 189, is attached internally in the mandrel 141a, and supports a shaft 191, the latter carrying a pair of gears 192 and 193. The sleeve 189 acts as bearing surface for the shaft 136a. A gear 194 coupled operatively to the shaft 136a by means of a screw 195 is cooperating meshingly with the gear 192. The contacted disc 186 is coupled operatively to a bushing 196, the latter being supported on the sleeve 189 and free to rotate with respect to it. The bushing 196 carries a gear 197, the latter meshing with the gear 193. The gear ratio between the respective gears 194 and 191 and 193 and 197 is 4 to 1, and the ratio between the gear 194 and 197 is thus 16 to 1. The displacement of the shaft 136a is transmitted by means of respective gears 194, 192, 193 and 197 to the disc 186 according to 16 to 1 ratio. The disc 186 carries four pair of interconnected contacts 184A, 184B, 184C and 184D, at approximately 90 degree spacing from each other, adapted to short circuit respective pairs of bars in the commutator 181. Thus potential of respective pins 183a associated at selective points with the resistance 130a is transferred to the pins 184a associated with the resistance 131. The potential assumed by the output contact device 137a is transferred by means of a conductor 156a to a wiping contact 157a, the latter supported in a non-conducting disc 158a and engaging on a collector ring 159a. The ring 159a is connected to the output terminal 161a by means of a conductor 160a. The disc 158a is connected fixedly to the shaft 136a at 155a.

To identify the bars of the commutator 181, a scale 201 can be attached to the mandrel 141a. Assuming, that the commutator 181 has 16 bars uniformly spaced along the periphery of the mandrel 141a, the scale 201 will have 16 scale divisions 202, divided into four respective groups and arranged as shown in Fig. 17a. For different bars plurality, a similar pattern of arrangement into four groups will apply, but the scale 201 will of course be provided with a corresponding number of scale divisions engraved on the mandrel 141a.

While the invention has been described with reference to certain embodiments, it should be borne in mind that it is applicable not merely to resistance elements, but to all types of variable voltage sources comprising voltage division means provided with tapping points from which voltages of different magnitude, phase, frequency etc. may be obtained and applied selectively to voltage interpolating means.

What I claim as novel and desire to protect by the Patent Letters is:

1. In combination, a mandrel having a groove, an impedance element disposed within said groove and a plurality of taps adjustably connected along the length of said groove in electrical engagement with said element.

2. The combination according to claim 1, including locking means to fixedly lock said taps at any point in said groove.

3. The combination according to claim 2 including a contact wiping device adapted to be disposed in electrical engagement along the length of said element.

4. In combination, a mandrel having a groove, an impedance element within said groove, said groove having an undercut cavity, a plurality of contact taps adapted for connection to said element and for adjustment along the length thereof, a plurality of flanged members supporting respective contact taps and locking means to lock said flanged members within said groove by means of said undercut cavity.

5. The combination according to claim 4 including a contact wiping device adapted to be disposed in electrical engagement along the length of said element.

6. In combination, a cylindrical mandrel having a helical groove, a multi-turn resistance winding within said groove, a plurality of taps adapted for connection to said element and adjustment along the length thereof, and locking means to fixedly lock said taps at any point along said groove in electrical engagement with said element.

7. The combination according to claim 6, including a contact wiping device adapted to be disposed in electrical engagement along the length of said element.

8. In combination, a support, voltage division means arranged along the length of said support, a plurality of contact elements, interlock means to readily mount respective ones of said elements on said support and to maintain them in conductive engagement with said division means, and means to adjust said elements along the length of said division means.

9. The combination according to claim 8, including locking means to lock said elements on said support fixedly in position.

10. The combination according to claim 9, wherein said locking means include a nut and screw arrangement.

11. The combination according to claim 10, including means to prevent the free turning of said elements while being locked in position.

12. The combination according to claim 8, including spring loading means to provide stable electrical connection between said contact elements and said division means.

13. The combination according to claim 8, wherein said division means comprises an electrical resistance element disposed helically around said support.

14. The combination according to claim 8, including scale means arranged along the length of said division means.

15. The combination according to claim 8, including a groove in said support, said voltage division means being disposed along the length of said groove, wherein said interlock means comprise a recess in said groove and a protuberance in said elements said protuberance being adapted for interlocking within said recess.

16. The combination according to claim 15, wherein said groove is helical.

17. The combination according to claim 8, including interpolating means adapted to be connected to said contact elements in shunt with respective sectors of said division means.

18. The combination according to claim 17, including a plurality of selectively spaced taps on said interpolating means and electrical conductor means to connect respective ones of said taps and said elements.

19. The combination according to claim 18, wherein said interpolating means comprises an electrical resistance element provided with a wiping brush adapted for displacement along the length of said resistance element.

20. The combination according to claim 19, including switch means controlled by said wiping brush, adapted to make or to break connection between respective ones of said contact elements and said taps.

21. The combination according to claim 20, including gear transmission to control said switch means by said wiping brush.

22. The combination according to claim 21, wherein said electrical conductor means comprises a rotary selector provided with a plurality of studs connected to said contact elements and with wiping contact means connected to respective ones of said taps, said wiping means being movable by said switch means between said studs.

23. The combination according to claim 21, wherein said electrical conductor means comprises a rotary selector provided with a plurality of studs connected to said contact elements and to said taps respectively, and with wiping contact means controlled by said switch means, and adapted to interconnect respective ones of studs connected to said elements with corresponding studs connected to said taps.

24. The combination according to claim 19, wherein said resistance element comprises electrical resistance wire arranged into single turn, circular, mechanically endless coil.

25. The combination according to claim 19, wherein said resistance element comprises a multi-turn, helically disposed electrical resistance wire.

26. The combination according to claim 8, including a rotary selector provided with a plurality of studs connected electrically to said elements and with a wiping contact means adapted to be disposed between said studs.

27. The combination according to claim 8, including a wiping contact means adapted to be disposed in conductive engagement with said division means and control member to move said wiping contact means along the length of said division means.

28. In combination, a plurality of resistance elements, a plurality of tapped connections on respective ones of said elements means to adjust said tapped connections along the length of respective ones of said elements, and means to electrically interconnect respective ones of said tapped connections.

29. In a functionally adjustable voltage divider, in combination, a pair of terminals, first electrical resistance element connected across said terminals, second electrical resistance element provided with a wiping contact device adapted to be disposed along the length thereof, a third terminal connected to said wiping contact device, a plurality of tapped connections on said first and on said second resistance elements, means to adjust respective ones of said tapped connections along the length of at least one of said resistance elements, and means to electrically interconnect respective ones of said tapped connections.

30. In combination, a pair of voltage division elements adapted to divide voltage in proportion to their longest dimensions respectively, said longest dimensions being divisible into a plurality of sectors of desired length, means to electrically interconnect in shunt respective ones of said sectors and means to vary the respective lengths of said sectors in at least one of said division elements.

31. The combination according to claim 30, including wiping contact means adapted to be disposed in conductive engagement along the length of one of said division elements.

32. In a functionally adjustable voltage divider, in combination, a pair of terminals, first electrical resistance element connected across said terminals, second electrical resistance element said first and said second resistance elements being divisible into a plurality of sectors of desired length, means to interconnect in shunt respective ones of said sectors, means to manually vary the lengths of respective ones of said sectors in said first resistance element, wiping contact device adapted to be disposed in conductive engagement along the length of said second resistance element and a third terminal connected to said wiping contact device.

33. In combination, voltage division means, voltage interpolating means, both of said voltage means being divisible into a plurality of sectors of desired length, control member to control the output of said interpolating means and means to connect in sequence, one by one, respective sectors on said voltage division means in shunt with corresponding ones of said sectors in said interpolating means, relative to displacement of said control member.

34. The combination according to claim 33, including means to vary the lengths of said sectors in at least one of said voltage means.

JERZY J. WILENTCHIK.

References Cited in the file of this patent

UNITED STATES PATENTS

| Number | Name | Date |
|---|---|---|
| 1,756,714 | Wackerly | Apr. 29, 1930 |
| 2,026,142 | Scholte | Dec. 31, 1935 |
| 2,122,370 | Harrison et al. | June 28, 1938 |
| 2,441,568 | Finison | May 18, 1948 |
| 2,454,184 | Kliever | Nov. 16, 1948 |
| 2,533,656 | Wills | Dec. 12, 1950 |